Dec. 13, 1949 E. A. HOBART ET AL 2,490,871
ALTERNATING CURRENT VERTICAL WELDER
Original Filed Feb. 11, 1947 2 Sheets-Sheet 1
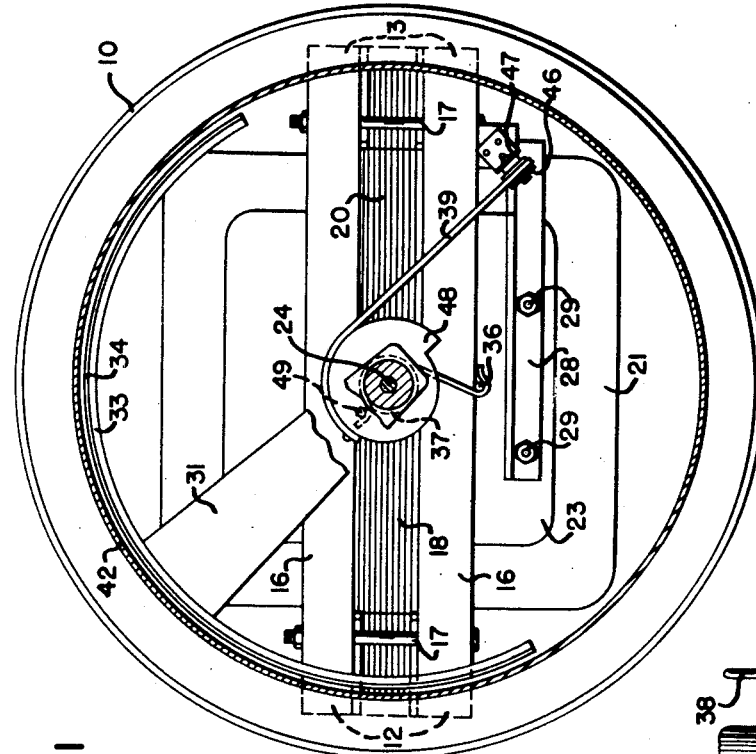
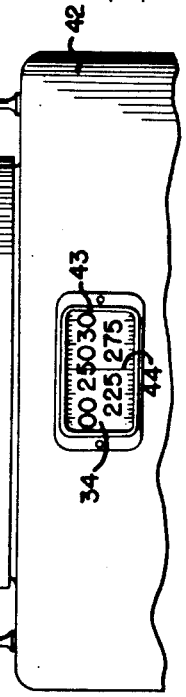
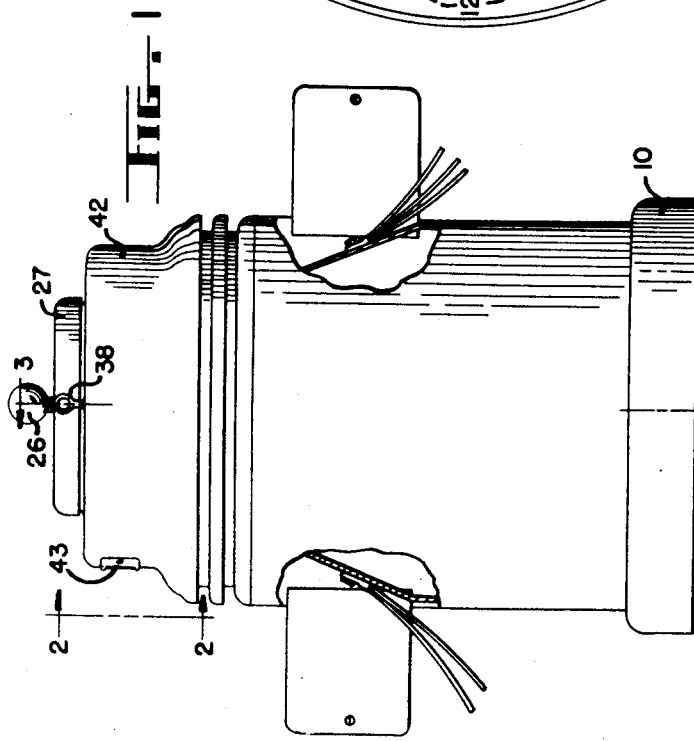
INVENTORS
EDWARD A. HOBART &
RUSSELL T. FLORA
BY Toulmin & Toulmin
ATTORNEYS Dec. 13, 1949   E. A. HOBART ET AL   2,490,871
ALTERNATING CURRENT VERTICAL WELDER
Original Filed Feb. 11, 1947   2 Sheets-Sheet 2

INVENTORS
EDWARD A. HOBART &
RUSSELL T. FLORA
BY Toulmin & Toulmin
ATTORNEYS

Patented Dec. 13, 1949

2,490,871

UNITED STATES PATENT OFFICE 2,490,871

ALTERNATING CURRENT VERTICAL WELDER

Edward A. Hobart and Russell T. Flora, Troy, Ohio, assignors to The Hobart Brothers Company, Troy, Ohio, a corporation of Ohio Original application February 11, 1947, Serial No. 727,830, now Patent No. 2,457,372, dated December 28, 1948. Divided and this application August 31, 1948, Serial No. 46,938

4 Claims. (Cl. 171—119)

This invention pertains to improvements in controls for welding transformers. This application is a division of my application #727,830, filed February 11, 1947, which on December 28, 1948, issued as Patent #2,457,372.

More particularly, this invention pertains to a method of adapting a uniformly scaled dial, for indicating the number of amperes being produced in a welding apparatus, to a welding transformer in which the rate that the amperes are given off is not uniform but one that varies according to the position of the transformer coils.

In welding transformers, the amperage varies according to the proximity of the primary and secondary coils. When these coils are in their closest relationship, the output of amperes is highest. As the primary coil is moved away from the secondary coil, the quantity of amperes produced decreases at a rapid rate at first, but at a slower rate as the coils are moved farther apart. This change in rate of amperes produced would ordinarily require that the dial used in connection with the welding transformer to indicate the amperes being produced at any given time would necessarily have to be one incorporating a graduated scale in order to compensate for this changing rate.

Accordingly, an object of this invention is to incorporate, in connection with a welding transformer, a dial capable of using a standard, uniformly graduated scale to indicate the number of amperes being produced in the welding apparatus.

Another object of this invention is to decrease the possibility of mistakes occurring in welding operations caused by incorrect dial readings, by making possible the use of an easily read, uniformly scaled dial instead of the more difficultly read, variably scaled dial.

Further features and advantages of this invention will appear from a detailed description of the drawings in which:

Figure 1 is a side view of a welding transformer incorporating the features of this invention.

Figure 2 is a front view of the upper portion of the welding transformer shown by the line 2—2 of Figure 1.

Figure 4 is a top view of the welding transformer shown by the line 4—4 of Figure 3.

Figure 3:
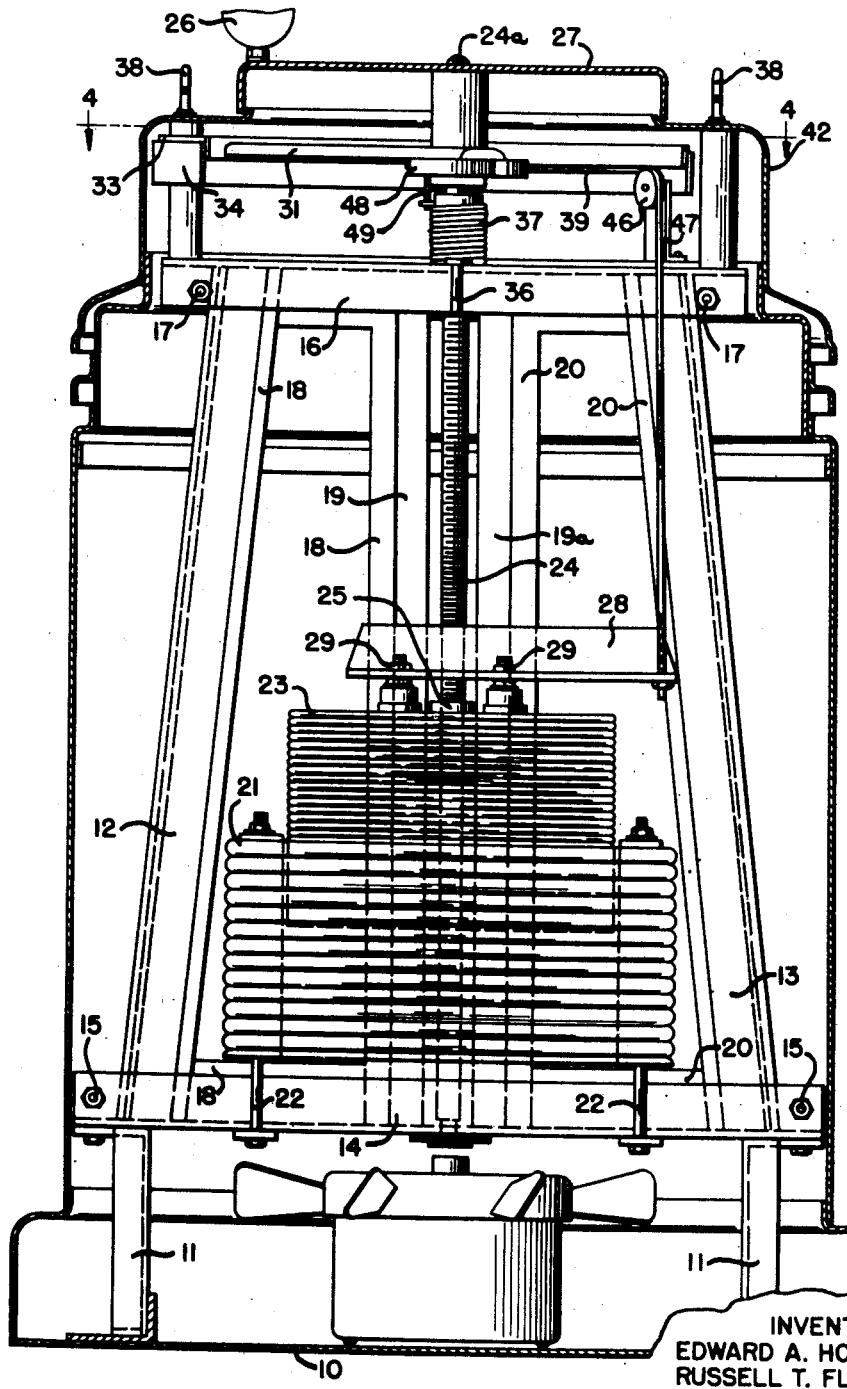
Figure 3 is a sectional and descriptive view shown by the line 3—3 of Figures 1 and 4.

Referring particularly to Figure 3, the welding transformer incorporating the features of this invention is best shown. The apparatus comprises a base 10 to which are attached frame supports 11. From each frame support 11, extending upwards in a slanting direction, is a pair of angle irons or frame members 12 and 13. The base of the front angle iron of the pair of angle irons 12 is connected by a cross member 14 to the base of the front angle iron of the pair 13. The bases of the rear angle iron of each pair of angle irons 12 and 13 are similarly connected. The cross members 14 are securely bolted at 15. The tops of the pairs of frame members 12 and 13 are similarly connected by cross members 16, Figure 4. The cross members 16 are held together by the bolts 17.

A core 18, referring again to Figure 3, is positioned between the pair of angle irons 12, the cross members 16 (note Figure 4), a strip 19, and the cross members 14. A core 20 is similarly positioned between the pair of angle irons 13, the cross members 16 (note Figure 4), a strip 19a, and the cross members 14. The secondary coil 21 is suitably fixed on the cross members 14 by the clamping bolts 22. The primary coil 23 is guided for vertical movement on the strips 19 and 19a of the core members 18 and 20. This movement is effected by a screw 24 and nut 25 fixed to the coil 23. The cores 18 and 20 both pass through the transformer coils 21 and 23. The primary coil 23 may be moved up or down on the screw 24 by movement of the knob 26 fixed to the cap 27, which cap is suitably fastened by a nut 24a to the screw 24.

An angle iron functioning as an arm 28 is fixed to the primary coil 23 by the bolt and nut arrangement 29. An arm 31 fixed to an eccentrically shaped pulley 48 is placed on the cross members 16, Figure 4, so that the screw 24 passes through the center of the eccentrically shaped pulley 48 in such a manner that the movements of the screw 24 and of the eccentrically shaped pulley 48 are independent of each other. To the end of the arm 31 is attached a semi-circular metal band 33. To this band 33 is secured a card 34 on which is printed a uniformly graduated scale. Also fixed to the cross members 16 are eyelets 38 by which the whole welding apparatus may be lifted.

A cover 42, Figure 2, is placed around the apparatus. In the cover 42 is a window 43 having a fixed indicator line 44 through its center. Through the window 43 may be seen the card 34 on which the uniform scale is printed.

In operation, referring again to Figure 3, rotating the cap 27 by the knob 26 turns the screw 24 so that the primary coil 23 is either raised or lowered as desired.

Referring to Figures 3 and 4, there is provided a cam or eccentrically-shaped pulley, 48.

To the primary coil 23 is fixed an arm 28. A cable 39 is fastened to the end of this arm 28. The cable 39 passes over an idler pulley 46 which is fixed to an arm 47 fixed on the cross member 16. The cable 39 is attached to and wrapped around a cam or eccentrically-shaped pulley 48 secured to the arm 31. A torsion coil spring 37 placed around the screw 24 and resting on the cross members 16 has its ends secured to the rod 36, fixed to the cross members 16, and the rod 49, attached to the cam or eccentrically-shaped pulley 48. The pulls exerted on the cam 48 and arm 31 by the spring 37 and cable 39 are in opposition to one another.

The necessary variations in the distance that the card 34 must move in order to indicate the amperes being produced by the welding apparatus are caused by this cam arrangement. As the primary coil 23 is moved away from the secondary coil 21, the cam or eccentrically-shaped pulley moves at first through great distances and then, as the coils become farther apart, through shorter distances. Thus, this arrangement provides a method for using a uniformly scaled card to indicate the amperes produced in a welding apparatus in which the rate of amperes given off is not uniform but one which varies, depending on the distance relationship of the transformer coils. Again this changing rate is compensated for by the mechanism, in this case the cam arrangement, rather than by varying the graduations of the scale used on the dial card.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

What is claimed is:

1. In a welding transformer, a pair of relatively movable coils, nut and screw means operable to effect said relative movement, a manually rotatable cap fixed to said screw, and a knob for rotating said cap, an indicating dial having a series of uniformly spaced indices, a fixed indicator line positioned relative to the indices on said dial, an eccentrically shaped pulley fixed to rotate with said dial, a cable attached to and operating over the eccentrical portion of said pulley and having its other end connected to one of said coils, and resilient means for normally rotating said dial and eccentrically shaped pulley to maintain said cable under tension so that relative movement of said coils upon rotation of said screw effects a non-uniform relative rotation of said dial and cap.

2. In a welding transformer having a frame, a coil fixed on said frame, a second coil movable on said frame relative to said first coil, a nut fixed to said second coil, a screw operating in said nut rotatably journaled against axial movement of said frame, a manually rotatable cap fixed to said screw for rotating said screw to cause relative movement of said coils, an indicating dial journaled for rotation about the axis of said screw, a series of uniformly spaced indices on said dial, a reference line fixed on said frame in indicative relationship to said graduations and means for rotating said dial upon actuation of said screw including a pulley fixed on said dial, an eccentrically shaped periphery on said pulley, a cable fixed to said pulley and operating over said eccentrically shaped periphery of said pulley, means for connecting the other end of said pulley to said second coil, and resilient means for normally rotating said dial and eccentrically shaped pulley in a direction to maintain tension in said cable.

3. In a welding transformer, a fixed coil and a movable coil, nut and screw means connecting said coils operable to effect movement of said movable coil, manual means for rotating said screw for moving said movable coil into its several operative positions, an indicating dial having a series of uniformly spaced indices thereon, a fixed indicator line positioned relative to the indices on said dial, an eccentrically shaped pulley fixed to rotate with said dial, and flexible inextensible means having one end connected to said pulley and its other end connected with said movable coil and passing around the eccentric part of said pulley whereby uniform movement of said movable coil brought about by uniform rotation of said screw will be accompanied by a nonuniform movement of said dial.

4. In combination in a welding transformer having a fixed coil and a movable coil and manually operable means for moving the movable coil into its several operable positions; a housing enclosing said transformer having a window therein and a fixed indicator line extending across the said window, a dial in said housing adjacent said window, an arm supporting said dial and pivoted to move said dial relative to the window and indicator line, an eccentric pulley on said arm, and flexible inextensible means secured at one end to said pulley and at its other end to said movable coil and passing over the eccentric part of said pulley whereby a variable ratio drive is established from said movable coil to said dial.

EDWARD A. HOBART.
RUSSELL T. FLORA.

REFERENCES CITED

The following references are of record in the file of this patent:

UNITED STATES PATENTS

| Number | Name | Date |
| --- | --- | --- |
| 516,847 | Thomson | Mar. 20, 1894 |
| 597,180 | Gates | Jan. 11, 1898 |
| 2,438,202 | Burns | Mar. 23, 1948 |
| 2,457,372 | Hobart | Dec. 28, 1948 |